United States Patent [19]
Fling et al.

[11] Patent Number: 4,866,930
[45] Date of Patent: Sep. 19, 1989

[54] MEMBRANE SEAL FOR APPLICATION TO PULSED ROCKET MOTORS

[75] Inventors: Michael Fling, Mesa, Ariz.; William R. Puckett, Decatur, Ala.

[73] Assignee: Morton Thiokol, Inc., Chicago, Ill.

[21] Appl. No.: 262,104

[22] Filed: Oct. 19, 1988

Related U.S. Application Data

[63] Continuation of Ser. No. 498,603, May 26, 1983, abandoned.

[51] Int. Cl.⁴ .............................................. F02K 9/28
[52] U.S. Cl. ...................................... 60/250; 60/255; 60/256; 60/263
[58] Field of Search ............... 60/250, 253, 254, 255, 60/256, 263; 102/202, 287, 291, 374, 530, 531; 239/265.15, 265.43

[56] References Cited

U.S. PATENT DOCUMENTS

| | | | |
|---|---|---|---|
| 2,764,173 | 9/1956 | Renner | 137/68 |
| 2,766,904 | 10/1956 | Philip | 220/89 |
| 2,856,851 | 10/1958 | Thomas | 102/374 |
| 3,083,610 | 4/1963 | Lancy | 60/253 |
| 3,248,875 | 5/1966 | Wolcott | 60/254 |
| 3,293,855 | 12/1966 | Cuthill et al. | 60/229 |
| 3,301,184 | 1/1967 | Reinstein et al. | 102/378 |
| 3,340,691 | 9/1967 | Mangum | 60/250 |
| 3,354,647 | 11/1967 | Aycock | 60/220 |
| 3,564,845 | 2/1971 | Friedman, Jr. et al. | 60/39.47 |
| 3,568,448 | 3/1971 | Webb, Jr. | 60/250 |
| 3,888,079 | 6/1975 | Diesinger | 60/250 |

*Primary Examiner*—Stephen C. Bentley
*Attorney, Agent, or Firm*—James C. Simmons; Gerald K. White

[57] ABSTRACT

A thin membrane of high strength but ductile material is placed over a perforated structural support, thus allowing high pressure on the membrane side of the support to separate one chamber from another. Upon application of pressure through the perforated structural supporting structure, the membrane will collapse allowing communication between chambers. The arrangement has utility in rocket motors and gas generators where discrete impulse segments are desired to be available on command, and may be fabricated in concentric or tandem (series) volumes.

7 Claims, 2 Drawing Sheets

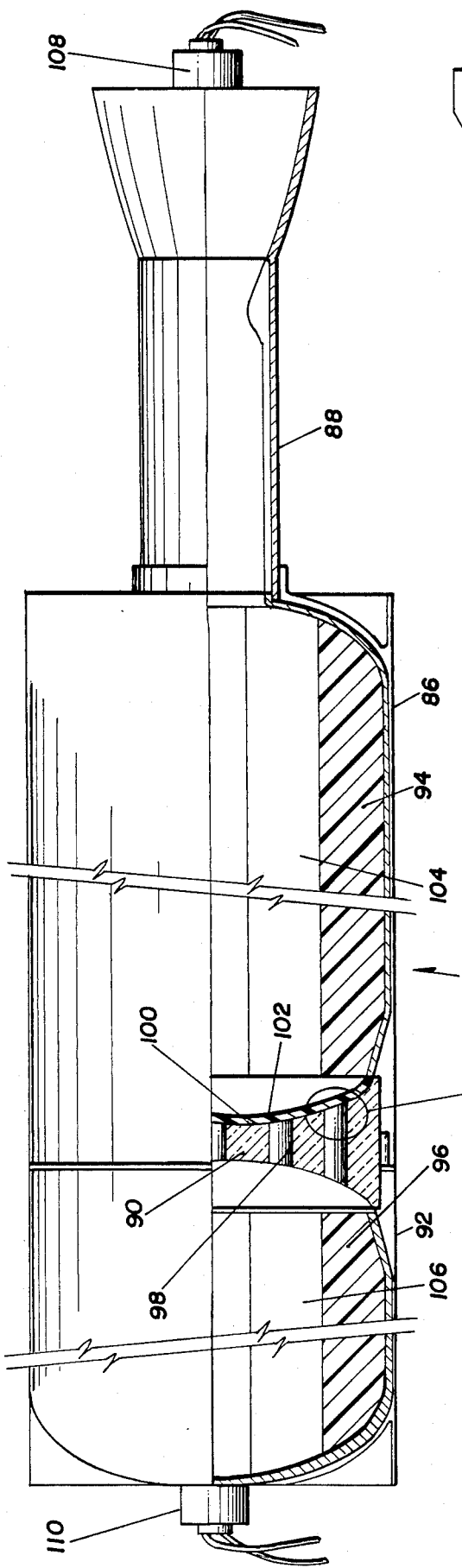
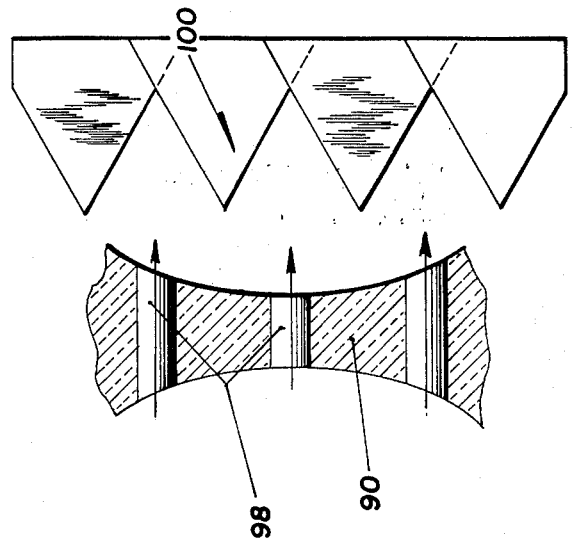
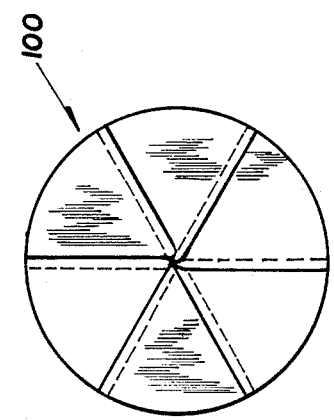

MEMBRANE SEAL FOR APPLICATION TO PULSED ROCKET MOTORS

This is a continuation of co-pending application Ser. No. 498,603 filed on May 26, 1983, now abandoned.

BACKGROUND OF THE INVENTION

1. Field of the Invention

The present invention relates to improvements in solid propellant rocket motors or gas generators, and more particularly, to such devices having a plurality of solid propellant units disposed therein and embodying a membrane seal structure that enables the ignition of the propellant units to be independent of each other whereby discrete impulses are available upon command.

2. Description of the Prior Art

The entire propulsive capability of solid propellant rocket motors is usually spent during the combustion process of one mass of solid propellant. This is for the reason that once a solid propellant is ignited it is very difficult to stop the combustion process until the entire mass of ignited propellant has been consumed.

It has been proposed in the prior art to provide a solid propellant rocket motor with an ability to fire more than once, that is, a rocket motor with a "start-stop-restart" capability by providing two or more concentric units, that is, layers of zones of solid propellant in a combustion chamber with a flame inhibiting barrier separating the layers, the barrier being made of a material that will confine the burning to a single layer or zone but nevertheless is destructible so that the next adjacent layer may be ignited.

One such prior art arrangement for providing a rocket motor that may be fired more than once is disclosed in U. S. Pat. No. 3,293,855 granted on Dec. 27, 1966 to W. E. Cutill et al wherein a pyrotechnic and an electrically ignitable film are provided between each of the layers for igniting, upon command, and in turn, each of the next adjacent layers.

Other such prior art arrangements are disclosed in U.S. Pat. Nos. 3,564,845 granted to I. H. Friedman et al, Jr. on Feb. 23, 1971 and 3,568,448 granted to G. E. Webb, Jr. on Mar. 9, 1971 wherein one of two solid propellant concentric layers that are separated by a flame inhibiting barrier is ignited by an igniter that is extended through the rocket motor nozzle into the combustion chamber. The other layer is ignited by a gas generator that is connected by a tubular extension to the head end of the combustion chamber. A rupturable membrane seal and perforated support member assembly is provided to isolate the gas generator from the motor combustion chamber during burning of the first rocket propellant layer.

U.S. Pat. Nos. 3,340,691 granted on Sept. 12, 1967 to G. F. Mangum and 3,354,647 granted on Nov. 28, 1967 to W. C. Aycock disclose similar arrangements but involve the admission of liquid fuel to the combustion chamber for the destruction of the flame inhibiting barrier and the ignition of the adjacent layer of propellant.

All of such prior art patented disclosures are characterized in the provision of a single combustion chamber for a plurality of concentric solid propellant layers or zones, in involving the destruction of the flame inhibiting barrier between layers in order to initiate combustion and firing of the next adjacent layer, and in the use of a relatively complicated ignition arrangement for effecting destruction of the barrier and ignition of the next adjacent layer. The Friedman, Jr. et al and Webb, Jr. patented disclosures further involve the use of a rupturable membrane and perforated support member which when ruptured and disintegrated, respectively, tend to introduce debris into the combustion chamber. The Mangum and Aycock patented disclosures further involve the admission of liquid fuel to the combustion chamber.

SUMMARY OF THE INVENTION

An object of the invention is to provide improved solid propellant rocket motors and gas generators that may be fired more than once, or pulsed, and which do not involve the destruction of flame inhibiting barriers, nor the use of rupturable membranes and supporting members that break up or disintegrate, and which allow the use of conventional ignition means for igniting the different solid propellant units.

A more specific object of the invention is to provide an improvement in such solid propellant rocket motors and generators comprising the physical separation of a plurality of combustion chambers to facilitate the production of discrete impulse segments upon command.

Another specific object of the invention is to provide such improved motors and generators which may be fabricated in as many concentric or tandem, that is, series, combustion chamber volumes, as desired.

In accomplishing these and other objectives of the invention there is provided a solid propellant rocket motor or gas generator wherein a thin membrane of high strength but ductile material such as nickel 0.010 inches thick is placed over a perforated structural support or bulkhead that separates concentrically or tandemly fabricated combustion chambers thereby allowing pressure on the membrane side of the structure that is substantially higher than that on the other side of the structural support to separate one chamber from the other. Upon application of substantial pressure in the reverse direction through the perforated supporting structure, the membrane collapses allowing communication between the chambers.

The rocket motor or gas generator according to the invention may be packaged in as many tandem or concentric combustion chamber volumes, as desired. Each combustion chamber volume may include one or more units or layers of solid propellant.

BRIEF DESCRIPTION OF THE DRAWINGS

Having summarized the invention, a detailed description follows with reference being made to the accompanying drawings which forms part of the specification, of which:

FIG. 2 is a schematic view, partly in longitudinal cross section, illustrating the manner in which another form of membrane seal structure according to the invention physically separates tandem combustion chambers of a rocket motor; and FIGS. 3, 4 and 5 illustrate the construction and operation of the membrane seal structure of the apparatus embodiment of FIG. 2.

DESCRIPTION OF THE PREFERRED EMBODIMENTS

Figure 1:
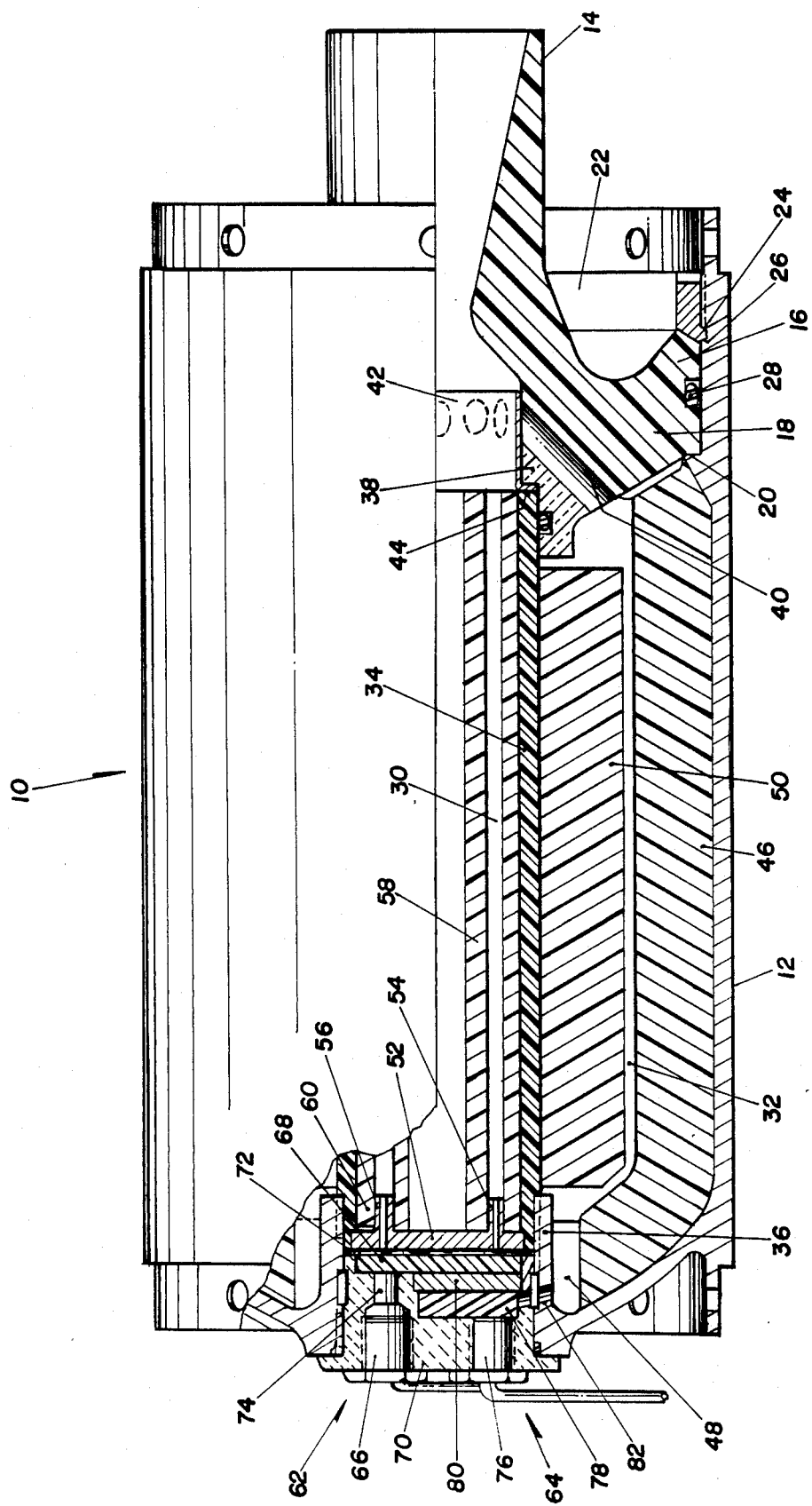
FIG. 1 is a schematic view, partly in longitudinal cross section, illustrating the manner in which a membrane seal structure according to the invention physically separates concentric combustion chambers of a rocket motor.

Referring to FIG. 1 of the drawings, the reference numeral 10 is used to generally designate a solid propellant rocket motor.

The solid propellant rocket motor 10 includes a rocket motor case 12 that may be made of aluminum and has a nozzle 14 of converging-diverging type attached to the aft end thereof. Nozzle 14 may be a phenolic molding, and as shown, may be formed integrally with a generally cylindrical member 16 having a forwardly located annular structural support portion 18 of reduced diameter. Member 16 is held in the aft end of case 12 between an internal circumferential rib 20 provided therein and an aluminum retaining ring 22 that is provided at the end of case 12. A bead 24 on the periphery of ring 22 engages a circumferential groove 26 on the inner surface of case 12 for locking the nozzle 14 and member 16 in place, an O-ring seal 28 being provided between member 16 and the interior surface of case 12.

As shown in FIG. 1, the space within case 12 between the forward end thereof and the structural support portion 18 is divided into first and second concentric volumes or combustion chambers designated 30 and 32, by a tubular member 34, that may be made of a glass phenolic material. At the forward end thereof the tube 34 is supported within an interior cylindrical re-entrant portion 36 of case 12, being suitably retained therein. The aft end of tube 34 fits within and is supported by the structural support portion 18, abutting against a shoulder 38 provided on the latter.

Communication between the combustion chambers 30 and 32 is provided by perforations 40 that are provided in the structural support portion 18. Perforations 40, of which, typically, there may comprise four to twelve, slant clockwise aft of the rocket motor 10 from the vertical at an angle of about 45°.

Normally perforations 40 are covered by a thin imperforate annular metallic membrane or cover 42 of high strength but ductile material, preferably made of nickel having a thickness of 0.010 inches (0.0254 cm). The membrane 42 is retained in place by a flange 44 formed integrally therewith that fits between the end of tube 34 and shoulder 38. With membrane 42 in place with the outer surface thereof normally closing perforations 40, combustion chambers 30 and 32 are physically separated. That is to say, membrane 42 allows high pressure on the membrane side of the structural support 18 to separate chamber 30 from chamber 32. On application from chamber 32 of pressure through the perforations 40 in the structural support 18, the membrane 42 collapses allowing communication between chambers 30 and 32.

Cast into or bonded to the interior wall of case 12 in chamber 32, between the rib 20 and the forward end of the case 12, is a first generally cylindrical unit or layer 46 of solid propellant grain. As shown in the drawing, the shape of the forward end of the grain 46 conforms to the curvature of the forward interior wall of case 12. The grain 46 terminates short of the case re-entrant portion 36 to provide an annular space designated 48 the purpose of which is described hereinafter. Located concentrically with the propellant grain 46 in chamber 32 is a second cylindrical unit or layer solid propellant grain 50 that is bonded on the exterior surface of the tubular member 34.

The forward end of the tubular member 34 is closed, as shown, by a disk-like member or plate 52 that may be made of a suitable metal. Formed integrally with the plate 52 are rearwardly extending tubular projections 54 and 56, the plate 52 being perforated in line with each of the projections 54 and 56 to provide communication therethrough.

Suitably attached to each of the projections 54 and 56, as shown in the drawing, are "stick type" solid propellant units 58 and 60, respectively. The propellant units 58 and 60 are hollow and extend rearwardly for substantially the length of the tubular member 36, no fixed support for the propellant units 58 and 60 being provided at the aft end other than allowing the units 58 and 60 to rest against each other and against the inner wall of tubular member 34. Only two such projections 54 and 56 are illustrated in FIG. 1, but as those skilled in the art will understand, additional such projections and concomitant perforations in plate 52 may be provided, as desired, thus enabling the use of corresponding additional "stick type" propellant units.

Positioned within the opening formed by the re-entrant portion 36 between the plate 52 and the extreme forward end of case 12 are first and second igniters that are indicated at 62 and 64.

Igniter 62, as shown, includes an electric squib 66 and pyrotechnic material 68 that are positioned within a cylindrical ceramic plug 70 having several openings cut out therein. Plug 70 is provided to close the opening at the forward end of case 12 that is formed by the re-entrant portion 36, being sealed therein by a sealing ring 72 and screw threads on the plug 70 engaging internal screw threads in the opening of re-entrant portion 36. The pyrotechnic material 68, as shown, is positioned between the inner end of plug 70 and the perforated plate 52, being slightly spaced therefrom by suitable spacing ring 72. A short passage 74 is provided between the squib 66 and the pyrotechnic material 68. Communication between the pyrotechnic material 68 and chamber 30 is provided by the aforementioned perforations in plate 56 and projections 54 and 56.

Igniter 64 includes an electric squib 76 and pyrotechnic material 78 that also are positioned within openings in the plug 70 with the end of squib 76 contacting pyrotechnic material 78 and a metal plate 80 separating and isolating the pyrotechnic material 78 from the pyrotechnic material 68. A passage 82, preferably several such passages, in the wall of the re-entrant portion 36 provides communication between the pyrotechnic material 78 and chamber 32.

Any one of a number of pyrotechnic materials may be used for the pyrotechnic material 68 and 78, a typical material being a granular mixture of 25% by weight of boron and 75% of potassium nitrate.

In the operation of the rocket motor 10, the squib 66 is fired first, a suitable interlock circuit being provided in the actuating circuitry for the squibs 66 and 68 to preclude firing first of the latter. Upon firing of squib 66, flame traverses the passage 74 to ignite the pyrotechnic material 68. Ignition of the pyrotechnic material 68 causes burning gases to traverse the annular space 48, the perforations in plate 52, the several projections 54 and 56 and to flow through the stick type solid propellant units 58 and 60 thereby igniting the latter. High pressure quickly builds up in combustion chamber 30 causing a rocket propelling flow of gases outward of the nozzle 14. The high pressure on the membrane side of the support structure 18 causes the membrane 42 to be pressed tightly against the openings of perforations 40 thereby sealing the perforations 40 and separating chamber 30 from chamber 32. Burnout of the stick type propellant units 56 and 58 and other similar units, if provided, typically occurs very rapidly. Upon such burnout, the pressure in the combustion chamber 30 drops very rapidly, as does also the flow of gases outward of nozzle 14. Activation of the solid propellant layers or units 46 and 50 in chamber 32 does not occur, however, until the electric squib 76 has been fired.

Upon firing of electric squib 76 and ignition of pyrotechnic material 78, burning gases traverse the passage or passages 82 to ignite the solid propellant layers or units 46 and 50. High pressure quickly develops in combustion chamber 32. The application of this pressure through the perforations 40 in the structural support portion 18 causes the membrane 42 to collapse allowing communication between the chambers 32 and 30, thereby establishing a second outward flow of rocket motor propelling gases through nozzle 14.

In this manner discrete impulse segments are available on command from the rocket motor 10. It will be apparent to those skilled in the art that more than two such impulse segments may be provided by the addition of other similar concentric solid propellant units.

In FIGS. 2-4 there is illustrated another embodiment of the invention wherein solid propellant units are packaged or fabricated in a tandem arrangement for providing a solid propellant rocket motor having the capability of delivering discrete impulse segments on command.

The solid propellant rocket motor 84 shown in FIG. 2 includes a first rocket motor case 86 having a blast tube 88 attached to the aft end thereof. The blast tube 88, as shown, combines in a single unit the functions of a nozzle of the converging diverging type, the blast tube, and suitable flange means for attachment to the motor case 86. The rocket motor 84 further includes, suitably attached to and closing the forward end thereof a perforated generally cylindrical structural support 90, the structural support 90, in turn, being suitably attached to a second rocket motor case 92 with the ends of the motor case 84 and 92 in lapped relation. The forward and aft side of the perforated structural support 90 are dished, as shown. Perforations 98 that run parallel to the longitudinal axis of the motor 84 are provided in support member 90.

Rocket motor cases 86 and 92 and blast tube 88 may be made of any suitable material, an insulating layer of phenolic molding compound being provided in blast tube 88 and motor cases 86 and 92. A solid propellant unit or layer 94 is provided within case 86, a similar solid propellant unit or layer 96 being provided within case 92.

At the forward end of rocket motor case 86 positioned closing relation to perforations 98 in structural support 90 is a thin dish-shaped membrane or cover 100 of high strength but ductile material such as nickel and that conforms to the shape of the aft side of the structural support 90. A soft insulation 102 such as polyisoprene is bonded to and covers the side of the membrane 100 that faces the combustion chamber, indicated at 104, formed interiorly of rocket motor case 86. A combustion chamber indicated at 106 is formed interiorly of case 92. A somewhat enlarged view showing portions of the structural support 90, the membrane 100 and polyisoprene layer 102 is illustrated in FIG. 3.

For igniting the solid propellant layer 94 a first electric igniter 108 may be mounted in the nozzle and blast tube 88, as shown. A second electric igniter 110 may be suitably mounted in the forward end of rocket motor case 92 for igniting the solid propellant layer.

Membrane 100, as shown in FIG. 4, may be made in triangular or "pie shaped" pieces that are overlaid, preferably of 0.010 to 0.020 inches (0.0254 to 0.0508 cm.) nickel shim stock. FIG. 4 shows the pie-shaped pieces of the membrane in the overlaid relation assumed by the pieces when they are in effective perforation closing relation against the face of the structural support that faces combustion chamber 100.

In the operation of the tandem rocket motor, firing of the igniter 108 causes the solid propellant layer 94 to ignite resulting in a rapid buildup of high pressure in combustion chamber 104. The high pressure on the membrane side of the support structure 90 causes the polyisoprene insulation 102 and membrane 100 to be pressed tightly against the perforations 92 in support structure 90 thereby sealing the perforations 98 and separating combustion chamber 104 from combustion chamber 106. As a result a rocket propelling flow of gases issues outwardly of the blast tube and nozzle 88.

Upon burnout of the solid propellant unit or layer 94, the pressure in the combustion chamber drops, as does also the flow of gases outwardly of the blast tube and nozzle 88. Activation of the solid propellant unit or layer 96 in combustion chamber 106 does not occur until the igniter 110 is fired.

Upon firing of igniter 110, a suitable interlock being provided to preclude the firing of igniter 110 until igniter 108 has been fired, high pressure builds up in combustion chamber 106. This pressure causes the membrane 100 to collapse, the pie-shaped pieces being forced outwardly at the center thereof as seen in FIG. 5 and rupturing the polyisoprene insulation 102 bonded thereto. This allows communication between the chambers 106 and 104 through the perforations 98, and hence, establishes a second outward flow of rocket propelling gases through the blast tube and nozzle 88.

Discrete impulse segments are thus available on command from the tandemly arranged solid propellant rocket motor 84. As those skilled in the art will understand, additional tandem or series volumes may be provided, as desired, to provide addition rocket motor impulse segments.

Thus, there has been provided, according to the invention, a membrane seal assembly for application to pulsed rocket motors wherein a thin nickel membrane in the range of 0.010 to 0.020 inches thick having high strength but also ductile is placed over a perforated structural support that separates concentrically or tandemly fabricated rocket motor combustion chambers thereby allowing pressure on the membrane side of the structure that is substantially higher than the pressure on the other side of the structural support to separate one chamber from the other. Application of substantial pressure in the reverse direction through the perforated supporting structure causes the membrane to collapse, allowing communication between the chambers.

What is claimed is:

1. A membrane seal assembly for a solid propellant rocket motor having at least two solid propellant units therein including structural support means separating said solid propellant units and forming separate combustion chambers in said rocket motor with one of said solid propellant units in each of said chambers, said structural support means having perforations therein for providing communication between said chambers, said membrane seal assembly including a membrane seal made of high strength but ductile material and positioned in one of said chambers to cover said perforations to preclude communication between said chambers when a substantially higher pressure is present in said one chamber than in the other chamber and to allow communication between said chambers when a substantially higher pressure is present in the other of said chambers than in said one chamber, wherein said membrane seal is imperforate, wherein said structural support means is annular in form and forms separate combustion chambers that are concentrically positioned, said one chamber being the inner chamber, and wherein said membrane seal is annular in form and has the outer surface thereof normally positioned to close said perforations in said structural support means.

2. A membrane seal assembly as specified in claim 1 wherein said membrane seal has a thickness in the range of 0.010 to 0.020 inches.

3. A membrane seal assembly as specified in claim 1 wherein said membrane seal is made of nickel.

4. A membrane seal assembly as specified in claim 1 wherein said perforations slant clockwise aft of the rocket motor from the vertical at a substantial angle from the vertical.

5. A membrane seal assembly as specified in claim 1 further including first ignition means for igniting the solid propellant unit in said one chamber, and second ignition means for igniting the solid propellant unit in the other chamber.

6. A membrane seal assembly for a solid propellant rocket motor having at least two solid propellant units therein including structural support means separating said solid propellant units and forming separate combustion chambers in said rocket motor with one of said solid propellant units in each of said chambers, said structural support means having perforations therein for providing communication between said chambers, said membrane seal assembly including a membrane seal having a thickness in the range of 0.010 to 0.020 inches and made of high strength but ductile material and positioned in one of said chambers to cover said perforations to preclude communication between said chambers when a substantially higher pressure is present in said one chamber than in the other chamber and to allow communication between said chambers when a substantially higher pressure is present in the other of said chambers than in said one chamber, wherein said membrane seal is made of nickel and is imperforate, wherein said structural support means is annular in form and forms separate combustion chambers that are concentrically positioned, said one chamber being the inner chamber, wherein said perforations slant clockwise aft of the rocket motor from the vertical at a substantial angle from the vertical, and wherein said membrane seal is annular in form and has the outer surface thereof normally positioned to close said perforation in said structural support means.

7. A membrane seal assembly as specified in claim 6 further including
   first ignition means for igniting the solid propellant unit in said one chamber, and
   second ignition means for igniting the solid propellant unit in the other chamber.

* * * * *